US010395033B2

(12) United States Patent
Ince et al.

(10) Patent No.: US 10,395,033 B2
(45) Date of Patent: Aug. 27, 2019

(54) SYSTEM, APPARATUS AND METHOD FOR PERFORMING ON-DEMAND BINARY ANALYSIS FOR DETECTING CODE REUSE ATTACKS

(71) Applicant: Intel Corporation, Santa Clara, CA (US)

(72) Inventors: Tugrul Ince, Santa Clara, CA (US); Koichi Yamada, Los Gatos, CA (US); Ajay Harikumar, Santa Clara, CA (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/281,825

(22) Filed: Sep. 30, 2016

(65) Prior Publication Data

US 2018/0096147 A1    Apr. 5, 2018

(51) Int. Cl.
*G06F 21/56* (2013.01)
*G06F 11/36* (2006.01)
*G06F 21/52* (2013.01)

(52) U.S. Cl.
CPC ........ *G06F 21/566* (2013.01); *G06F 11/3604* (2013.01); *G06F 21/52* (2013.01); *G06F 2221/033* (2013.01)

(58) Field of Classification Search
CPC .... G06F 21/566; G06F 11/3604; G06F 21/52; G06F 2221/033

(Continued)

(56) References Cited

U.S. PATENT DOCUMENTS 8,285,999 B1 * 10/2012 Ghose ............... G06F 21/54
                                                            713/170
8,881,282 B1 * 11/2014 Aziz ................. G06F 21/554
                                                            726/23

(Continued)

FOREIGN PATENT DOCUMENTS

WO    2016048559    3/2016

OTHER PUBLICATIONS

International Searching Authority, "Notification of Transmittal of the International Search Report and the Written Opinion of the International Searching Authority," dated Dec. 20, 2017, in International application No. PCT/US2017/50209.

(Continued)

*Primary Examiner* — Abu S Sholeman
(74) *Attorney, Agent, or Firm* — Trop, Pruner & Hu, P.C.

(57) ABSTRACT

In one embodiment, a binary translator to perform binary translation of code is to: perform a first binary analysis of a first code block to determine whether a second control transfer instruction is included in the first code block, where the first code block includes a return target of a first control transfer instruction; perform a second binary analysis of a second code block to determine whether the second code block includes the first control transfer instruction, where the second code block includes a call target of the second control transfer instruction; and store an address pair associated with the first control transfer instruction in a whitelist if the second control transfer instruction is included in the first code block and the first control transfer instruction is included in the second code block. Other embodiments are described and claimed.

20 Claims, 5 Drawing Sheets

(58) Field of Classification Search
USPC .......................................................... 726/23
See application file for complete search history.

(56) References Cited

U.S. PATENT DOCUMENTS

| | | | |
|---|---|---|---|
| 9,934,374 B2* | 4/2018 | Krten .................... G06F 21/57 |
| 2004/0081201 A1* | 4/2004 | Simonnet ................ H04L 29/06 370/469 |
| 2005/0108562 A1* | 5/2005 | Khazan ............... G06F 11/3604 726/23 |
| 2005/0240756 A1* | 10/2005 | Mayer ................... G06F 9/4418 713/2 |
| 2007/0128899 A1* | 6/2007 | Mayer ................... G06F 9/4406 439/152 |
| 2008/0016339 A1* | 1/2008 | Shukla ................... G06F 21/53 713/164 |
| 2008/0134322 A1* | 6/2008 | Chauvel ................ G06F 9/4812 726/21 |
| 2008/0209557 A1* | 8/2008 | Herley .................. G06F 21/565 726/23 |
| 2010/0017879 A1* | 1/2010 | Kuegler ................ G06F 21/123 726/23 |
| 2010/0306516 A1* | 12/2010 | Suzuki .................. G06F 1/3203 712/240 |
| 2011/0030032 A1* | 2/2011 | Baykal .............. H04L 29/12264 726/3 |
| 2011/0265182 A1* | 10/2011 | Peinado ................ G06F 21/554 726/24 |
| 2013/0007881 A1* | 1/2013 | Liem ....................... G06F 21/14 726/22 |
| 2014/0156972 A1 | 6/2014 | Shanbhogue et al. |
| 2014/0236840 A1* | 8/2014 | Islam ................... G06Q 20/204 705/72 |
| 2014/0344932 A1* | 11/2014 | Polychronakis ...... G06F 21/562 726/23 |
| 2015/0095628 A1* | 4/2015 | Yamada .................. G06F 21/54 712/234 |
| 2015/0278516 A1* | 10/2015 | Caprioli .............. G06F 9/30145 726/22 |
| 2015/0301841 A1 | 10/2015 | Mackintosh et al. |
| 2016/0034687 A1 | 2/2016 | Rhee et al. |
| 2016/0110269 A1 | 4/2016 | Sahita et al. |
| 2016/0110542 A1 | 4/2016 | Shanbhogue et al. |
| 2016/0179546 A1* | 6/2016 | Yamada .................. G06F 21/54 712/240 |
| 2016/0180115 A1* | 6/2016 | Yamada ................ G06F 21/805 710/313 |
| 2017/0103210 A1* | 4/2017 | Baji-G l ................ G06F 21/577 |
| 2017/0116418 A1* | 4/2017 | Shanmugavelayutham ................ G06F 21/566 |
| 2017/0243002 A1* | 8/2017 | Polychronakis ........ G06F 21/54 |
| 2018/0004947 A1* | 1/2018 | Li ......................... G06F 21/566 |
| 2018/0011776 A1* | 1/2018 | Mayer ................ G06F 11/3466 |

OTHER PUBLICATIONS

U.S. Appl. No. 14/923,184, filed Oct. 26, 2015, entitled, "Hardware Heuristic-Driven Binary Translation-Based Execution Analysis for Return-Oriented Programming Malware Detection," by Palanivelrajan Rajan Shanmugavelayutham.

* cited by examiner

SYSTEM, APPARATUS AND METHOD FOR PERFORMING ON-DEMAND BINARY ANALYSIS FOR DETECTING CODE REUSE ATTACKS

TECHNICAL FIELD

Embodiments relate to detection and protection against computer system attacks.

BACKGROUND

In computing systems, common attack techniques include code reuse attacks, which seek use of existing code to create malware. In a return oriented programming (ROP) attack, existing code snippets called gadgets (ending with a RETURN (RET) instruction) are chained together to construct malicious computations. As of today, no reliable defense exists for advanced code reuse attacks. While certain defenses are available, they typically suffer from high overhead and complexity.

DETAILED DESCRIPTION

In various embodiments, on-demand lightweight binary analysis may be used to extract control flow information of an application binary image. This analysis may be combined with dynamic execution monitoring to detect ever-evasive code reuse attacks such as ROP attacks, including call-preceded ROP attacks.

To perform the techniques, for at least selected RET instructions, a preceding CALL instruction may be investigated to determine whether the return target is indeed the legitimate destination of a RET instruction of the CALL instruction in question, or a part of ROP gadget. In addition, embodiments provide additional techniques to further validate the legitimacy of function code discovered from binary analysis. In embodiments, these techniques include function prologue and epilogue code discovery, register convention violation and stack movement violation.

Embodiments may be applied to both a branch history analysis using hardware-maintained information such as last branch records (LBRs) and/or trace recording hardware, and to binary translation (BT)-based forward execution analysis. Embodiments may mitigate runtime overhead of the binary analysis by: (1) use of a fast decoder that only provides decoding capability for control transfer instructions and instruction length; and (2) whitelisting of already validated pairs of From/To branch addresses.

Embodiments provide effective detection of ROP, jump oriented programming (JOP) and call oriented programming (COP) attacks when the original instruction boundaries and the function entry point (e.g., application programming interface (API) hook bypass) are violated, with low performance overhead by applying on-demand lightweight binary analysis that drastically decreases latency. Still further, embodiments provide significant protection against such attacks, as embodiments are difficult to circumvent by significantly enhancing basic heuristics with analysis of the function code to allow detection even in the absence of complete call history.

In various embodiments, hardware events such as ROP heuristics hardware events or software events such as critical API calls may be used to trigger on-demand instruction execution level binary analysis for validating a pair of From/To branch addresses to detect a ROP gadget. On-demand instruction level binary analysis may provide a number of techniques to discover the code regions, identify a legitimate function entry, identify legitimate instruction code sequences and instruction boundaries, to determine whether From/To branch addresses (e.g., RET and RET target addresses) in question are legitimate or not. On-demand binary analysis may leverage a binary translator's fast instruction decoding control flow graph formation and intermediate representation (IR) generation of x86 instructions. Note that embodiments assume no knowledge of execution history, namely no information is assumed to be available about which function calls have taken place so far.

Figure 1:
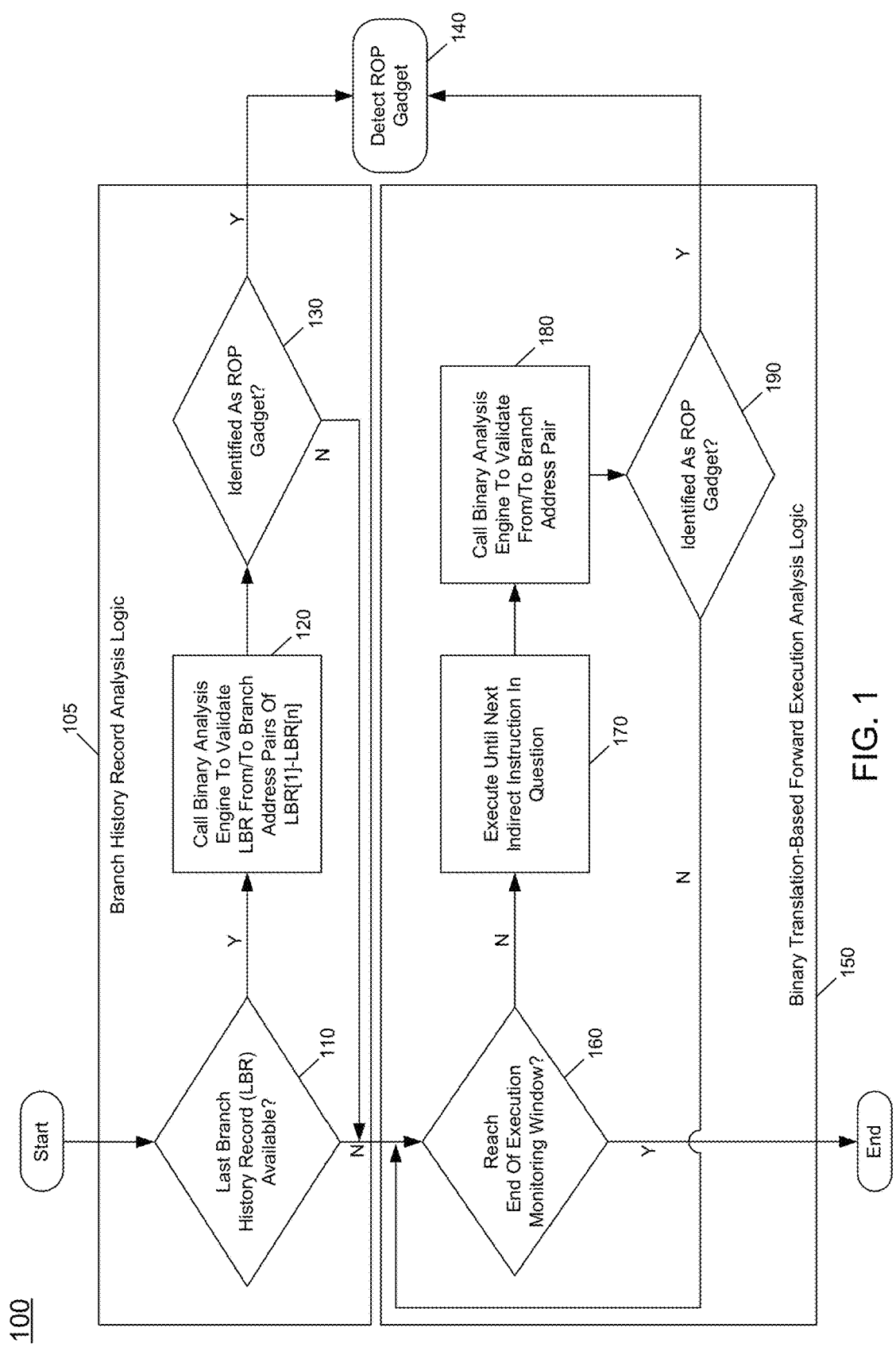
FIG. 1 is a high level flow diagram of a method in accordance with an embodiment.

Referring now to FIG. 1, shown is a high level flow diagram of a method in accordance with an embodiment. More specifically, method 100 may be used to perform on-demand ROP exploit detection analysis. As will be described herein, embodiments may be performed in hardware, software, firmware and/or combinations thereof. Since there is not a complete execution history for on-demand analysis, a return operation cannot be immediately declared legitimate. When a return operation results in a return misprediction at the hardware level, ROP heuristics hardware may generate an event (e.g., an interrupt) and allow, e.g., security software to start an on-demand instruction-level behavioral execution analysis to determine if the control flow operation is legitimate or part of a ROP operation by malware attack.

Figure 2:
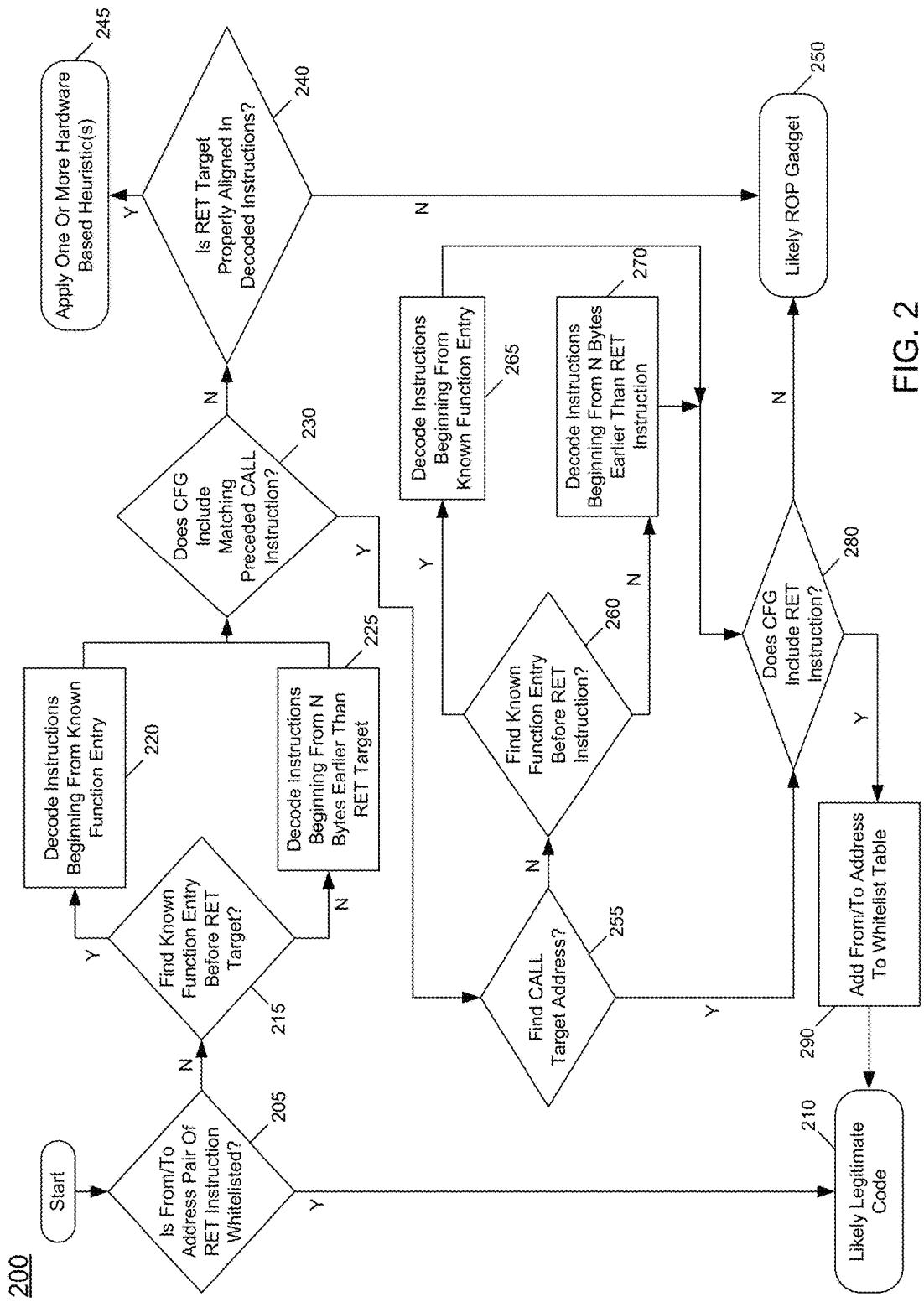
FIG. 2 is a block diagram of a method for performing binary analysis for ROP detection in accordance with an embodiment.

As seen in FIG. 1, method 100 may be executed by branch history record analysis logic 105. As illustrated, method 100 begins by first checking for presence of a last branch record recorded by hardware (diamond 110). If such record exists, control passes to block 120 where a binary analysis engine of a binary translation logic may be called, e.g., by the security software, to conduct validation of From/To address pairs of the recorded RET instructions (which in an embodiment may be performed as shown in FIG. 2, discussed below). Based on this analysis, at diamond 130 it is determined whether the From/To address pair in question is legitimate or a likely ROP gadget. If it is clear from this analysis that the return operation is part of a ROP gadget, control passes to block 140, to identify detection of the ROP gadget. In an embodiment, the binary analysis engine may communicate this ROP gadget detection to the security software.

Instead, when the history-based analysis performed at block 120 is not sufficient to determine the positiveness of a malware attack, control passes to a BT engine 150 to perform a BT-based instruction level forward execution analysis to determine if this return operation is of a ROP exploit or a false positive. As illustrated, this analysis begins by determining whether an end of an execution monitoring window has been reached (diamond 160). In an embodiment, this execution monitoring window may span several blocks of code, where a block is defined as a sequence of instructions that ends with an indirect branch, CALL or RET instruction. The number of blocks analyzed in this manner may be between approximately 100 and 1000 and can be set to an empirical value with limited runtime overhead and a good malware detection rate. If an end of an execution monitoring window has not been reached, the BT engine may perform the forward execution until a next indirect instruction (e.g., RET instruction) is encountered, at block 170. When a CALL-preceded gadget in question is found during the forward execution analysis, control passes to block 180 to call the binary analysis engine to conduct validation of From/To address pair of the RET instruction in question (described in FIG. 2). Then it can be determined at diamond 190 whether the binary analysis engine returns a decision that indicates the RET instruction is associated with a detected ROP gadget. If so, control passes to block 140, discussed above. Otherwise, control passes back to diamond 160 for further forward execution analysis, which continues until an end of the execution monitoring time window is reached.

Referring now to FIG. 2, shown is a block diagram of a method for performing binary analysis for ROP detection in accordance with an embodiment. As shown in FIG. 2, method 200 may be performed by a binary analysis engine in accordance with an embodiment. Note that for purposes of illustration, detection steps are described for an evasive CALL-preceded ROP gadget triggered by an attacker. Of course, understand that embodiments are not limited to this attack technique and apply to many other situations such as for validation of non-RET control flows in binary code for detecting, e.g., COP and JOP gadgets.

As shown in FIG. 2, at diamond 205, a whitelist check may be performed. More specifically, at diamond 205 it can be determined whether the From/To address pair of the indirect branch instruction in question is already whitelisted, as determined by presence of this address pair in a whitelist table, which may be monitored by the binary translator. If so, control passes to block 210, where it is reported that the indicated branch instruction is likely of legitimate code (block 210). In an embodiment, this indication may be reported to the security software. In this way, the expense of performing binary analysis of a previously validated pair of branch addresses can be avoided.

Otherwise, control passes from diamond 205 to diamond 215, where a caller-based side can be analyzed. More specifically, it can be determined whether there is a known function entry before the RET target. Note that due to the nature of a variable length instruction set architecture (ISA) such as an x86-based ISA, it is not always possible to determine if the return target is indeed a legitimate branch target. As such, a simple check for finding a CALL instruction preceding the return target can easily be bypassed by an attacker if the attacker is able to find a gadget that has the illusion of being preceded by a CALL instruction.

Figure 3:
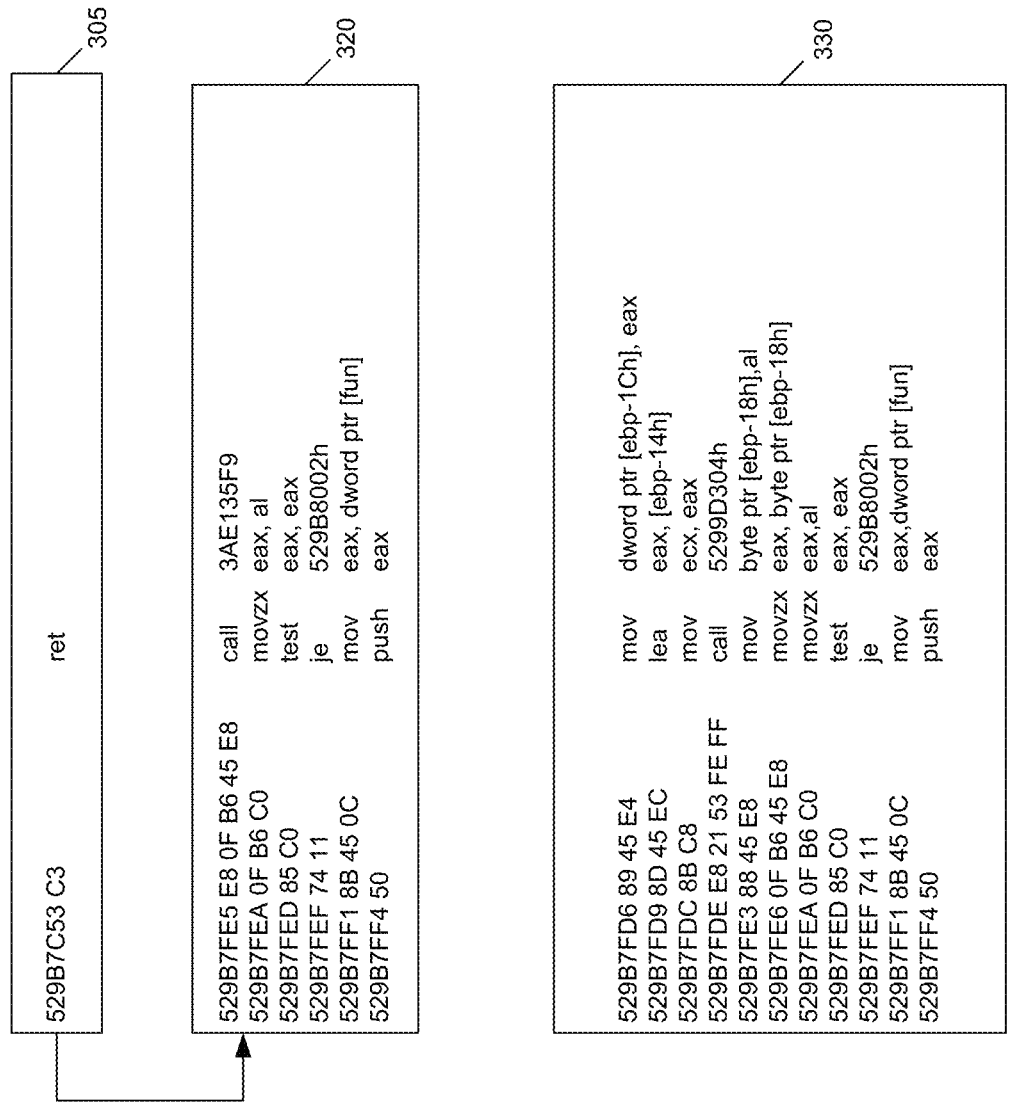
FIG. 3 is an example code blocks to undergo binary analysis as described herein.

FIG. 3 illustrates code snippets to demonstrate the identification of CALL instructions using an embodiment. At code line 305, a RET instruction transfers control to MOVZX instruction at address 0x529B7FEA within code chunk 320. A simple check of the return target results in identification of a CALL instruction at address 0x529B7FE5 (namely having opcode E8 encoding for an x86 CALL instruction). However, that CALL instruction is merely a misinterpretation of code bytes stored at that location. The actual instruction is a move instruction (MOV) illustrated in code chunk 330, and it starts at address 0x529B7FE3. The value E8 more properly shown in code chunk 330 is part of the MOV instruction. As seen, without an embodiment, this value may be interpreted incorrectly as an opcode for a CALL instruction, instead of its correct inclusion as data of another instruction. As such, embodiments can determine that some CALL instructions may not be legitimate.

With reference back to FIG. 2, at this point, the binary analysis engine may not only check for the existence of a CALL instruction preceding the return target, but may also determine whether this CALL instruction is indeed legitimate. In embodiments, this determination may be based on the binary code and a control flow graph (CFG) analysis from the code region analysis of the return target. In an embodiment, this determination may be based at least in part on examination of addresses found in an export table and relocate data that contain information about publicly exported function addresses to find and use the closest legitimate function entry address above the return target at which to begin a decoding process, which is performed at block 220 responsive to this known function entry point (where such known entry point is found).

Instead if at diamond 215, it is not possible to find a known function entry address in the vicinity of the return target that spans both the presumed CALL instruction and the return target, control passes to block 225 where a different decoding process may be performed. More specifically, as shown at block 225, the binary analysis engine performs decoding from an arbitrary earlier point in the code. As an example, the binary analysis engine may be configured to subtract a given number (e.g., a predetermined constant) from the return target address and start decoding instructions from that address. In one embodiment, this predetermined constant can be approximately 100 (bytes). This operation may occur, since although an embodiment may use a variable-length ISA, decoding instructions from two random code addresses yields to decoding the same instructions in as little as a few bytes. This is the case, as there is a tendency to quickly align with the actual instructions, even with differing starting addresses.

Still with reference to FIG. 2, control passes from both of blocks 220 and 225 for the binary analysis engine to form a CFG and follow the control flow until it reaches the return target address. Thus at diamond 230 it may be determined whether the CALL instruction identified via the decoding matches to the last instruction before the return target identified through the instruction decoding and CFG formation process. Note that failing to find a match means that the CALL instruction may not be legitimate. In this case, control next passes to diamond 240 to determine whether the return target is properly aligned on the instruction boundary found by the instruction decoding/CFG formation process described above. If not, the RETURN instruction may be determined to be likely a ROP gadget, and may be reported as such (e.g., to security software) at block 250.

Note that if it is determined at diamond 240 that the return target is properly aligned to the decoded instructions (but no CALL instruction preceding the return target is found) control may pass to block 245, where a number of heuristics may be applied before determining whether it is a true ROP attack. Although the scope of the present invention is not limited in this regard, such heuristics may include counting how many times a return target was not preceded by a CALL instruction earlier during execution and considering application specific information from prior executions, as some applications may have exceptional patterns.

If at diamond 230, a match is indicated, note that this does not end the inquiry. Instead, control passes to diamond 255 to continue to a callee-based side analysis. This additional analysis may determine whether the RET instruction is also legitimate and indeed is paired with the CALL instruction preceding the return target. As seen, at diamond 255 it is determined whether the call target for this CALL instruction can be found or is otherwise known, e.g., by examining this CALL instruction itself. If the CALL instruction is a direct call, the target can be obtained by decoding the CALL instruction (and control passes to diamond 280). Once the target of the CALL instruction is obtained, the binary analysis engine may decode the function (callee) called by this CALL instruction and determine if it can reach the RET instruction in question by decoding instructions starting from this known function entry and forming a CFG. If it can reach the matching RET instruction, the binary analysis engine may determine that the CALL and RET pair was legitimate by determining that the CFG includes the RET instruction (at diamond 280). Otherwise, it concludes that the CALL and RET pair was not legitimate, and control passes to block 250 to identify that the RET instruction is likely of a ROP gadget.

Note that even when a CALL instruction is an indirect instruction, a data flow analysis may be performed to discover the memory address that contains the call target. As such, control passes to diamond 260 to determine whether a known function entry can be found before the RET instruction.

Note that at diamond 260, if the call target of the CALL instruction in hand is not discoverable, the binary analysis engine may operate to determine whether it can find another function address in the vicinity of the RET instruction. In various embodiments, the binary analysis engine may check symbol table information, import/export table information and relocation data. Thus the binary analysis engine can validate whether a call can be legitimately made to the module that has the RET instruction by checking the export and import tables of both caller and callee modules. Once it obtains a function address that has a numerically smaller address than the RET instruction and is the closest to the RET instruction (as determined at diamond 260) the binary analysis engine starts decoding instructions starting from this discovered address and tries to reach the RET instruction (at block 265). Note that the address it obtains does not necessarily belong to the callee; however, the likelihood of being able to reach the RET instruction after decoding multiple functions in between is significantly high.

If the binary analysis engine cannot find a known function entry before the RET instruction, e.g., based on information from import/export tables and relocation data, control passes to block 270, where instruction decoding may begin from an arbitrary point. In an embodiment, the binary analysis engine can subtract a constant value (e.g., the same predetermined constant as in block 225) from the address of the RET instruction and start decoding.

Once the binary analysis engine has the decoded instructions and discovered the function exits following the CFG, control passes to diamond 280. At diamond 280, the binary analysis engine seeks to match the RET instruction in question to the RET instruction found in the instruction decoding and CFG formation process. If a match is found, then the CALL and RET pair is considered legitimate. As such, control passes to block 290, where, after the RET instruction and its return target address pair is validated and determined as legitimate, the validated pair of addresses are added to a whitelist table to avoid incurring runtime overhead of analyzing already-validated binary locations. If at diamond 280 it is determined that the CFG does not include the RET instruction, the pair is considered part of a ROP gadget (as identified and reported at block 250).

Note that in some embodiments, even if the above operations do not result in ROP gadget detection, additional levels of binary analysis may optionally be performed to further improve accuracy of ROP gadget detection. In such embodiments, the binary analysis engine may check whether the function identified as callee is indeed a legitimate function that is entered through a legitimate entry point (e.g., not skipped/hopped by gadget) and exits through a legitimate RET instruction through thorough instruction level analysis. To perform such analysis, in an embodiment, the following checks may be performed: (1) tracking stack pointer change from the function start to the function exit; (2) checking whether an application binary interface (ABI) holds for each function call; and/or (3) looking for the existence of function prologue and epilogue.

As to operation (1), note that the stack may grow downwards following the instruction sequence of the function, but should unwind back to the value of function entry at the function exit. The stack value should also not unwind beyond the starting stack value in the instruction sequences of the function. For this analysis, the binary analysis engine may not need the exact value of the stack pointer, rather it may be configured to identify the stack value save and restore operations and keep track of the stack pointer value adjustment (e.g., pop and push operations).

As to operation (2), function calls for legitimate code obey certain conventions for passing parameters and saving and restoring registers. If a register that is to be saved is not saved, or if a register that should not be saved is saved before a function call, this is a violation of the ABI and may indicate a RET instruction is not legitimate. For example, call oriented programming (COP) gadgets tend to pass values across by violating ABIs. If the function consumes uninitialized register values, it is a strong indication of a gadget passing parameters across gadgets using non-argument registers.

As to operation (3), most functions have well-recognized sequences of instructions at the start of the function called the prologue, and at the end of the function called the epilogue. Their absence is an indication that the RET instruction is not legitimate. However, valid functions may exist without proper prologues and epilogues due to aggressive compiler optimization. Therefore, this check may be applied when applicable to a target binary. Note that embodiments may also apply this check to identify the beginning of the function entry when the function entry is unknown before starting to apply the additional optional check operations.

Embodiments may use a fast instruction decoder to reduce the runtime overhead of the binary analysis. To this end, embodiments may implement a software-defined decoder that only performs instruction decoding for control transfer instructions and instruction length decoding. For example, this decoder may operate in approximately 10 cycles per x86 instruction. In addition, embodiments mitigate runtime overhead of recurring binary analysis with a whitelist of paired RET instruction and RET target addresses.

Figure 4:
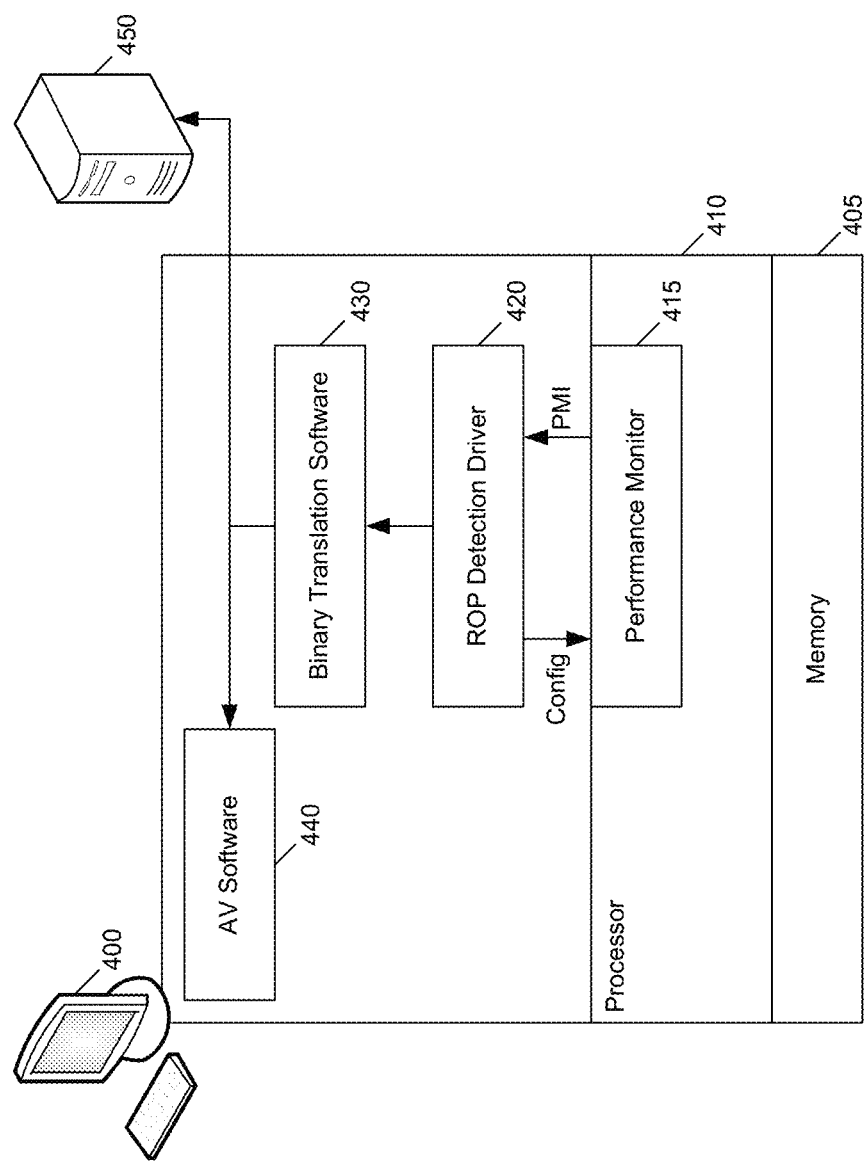
FIG. 4 is a block diagram of a system according to one embodiment.

Embodiments may use processor events that trigger a BT-based method. In turn, binary translation as described herein provides forward execution analysis to eliminate false positives and detect various code reuse attack with high accuracy with low overhead. FIG. 4 is a block diagram of a system implementing a combined hardware software ROP detection technique according to one embodiment. As illustrated, computer system 400 includes a processor 410 that provides hardware counters that may be useful for ROP detection by the hardware. Note that in embodiments, various processor hardware such as ROP detection hardware counters, a last branch record (LBR) recording facility, performance monitoring unit (PMU), processor trace, and dedicated ROP heuristic detection hardware, may be used to detect branch discrepancies such as RET/CALL bias, return mispredicts, indirect branch mispredicts, etc. to trigger the binary translation based execution-monitoring method. BT provides opcode-level execution runtime analysis after the trigger to determine the validity of a given control transfer instruction to eliminate false positive detections. Note that in different embodiments hardware may be specific to ROP detection or hardware counters that may be configured for various purposes including ROP detection, or both. Different models of processors may deploy different types of hardware counters. A memory 405 coupled to processor 410 may be used for storage of information related to the detection and analysis techniques described herein. Memory 405 also may store instructions that when executed cause system 400 to execute one or more of a ROP driver 420, BT software 430, and an anti-malware or security software (generally antivirus (AV) software) 440.

In an embodiment, processor 410 may include one or more ROP heuristic detection hardware counters to detect anomalies of branch executions such as RET/CALL bias which may be used to return mispredicts, indirect branch mispredicts, far branches, etc. Note that when dedicated ROP heuristic hardware does not exist on a processor, a set of model specific performance monitoring counters may be used. ROP device driver 420 may be used to configure ROP heuristic detection hardware counters and interface with BT software 430 to signal a branch anomaly event or any other kind of code flow anomaly (for example, a stack pointer modification). In turn, BT software 430 provides instruction level execution runtime analysis, which may be performed by binary translation hardware logic of the processor. Such logic may execute after a given trigger event, to apply a variety of instruction-level execution analysis methods as described herein to make a final decision (ROP malware versus false positive). Finally, AV software 440 may be used to configure BT software 430 through software interfaces (e.g., APIs). AV software 440 may receive a notification callback from BT software upon detection of malware activity and take a security measure against the attack (e.g., according to a given security policy). System 400 may be any type of computing device, such as, for example, a smartphone, smart tablet, personal digital assistant (PDA), mobile Internet device, convertible tablet, notebook computer, desktop computer, server, or smart television.

Figure 5:
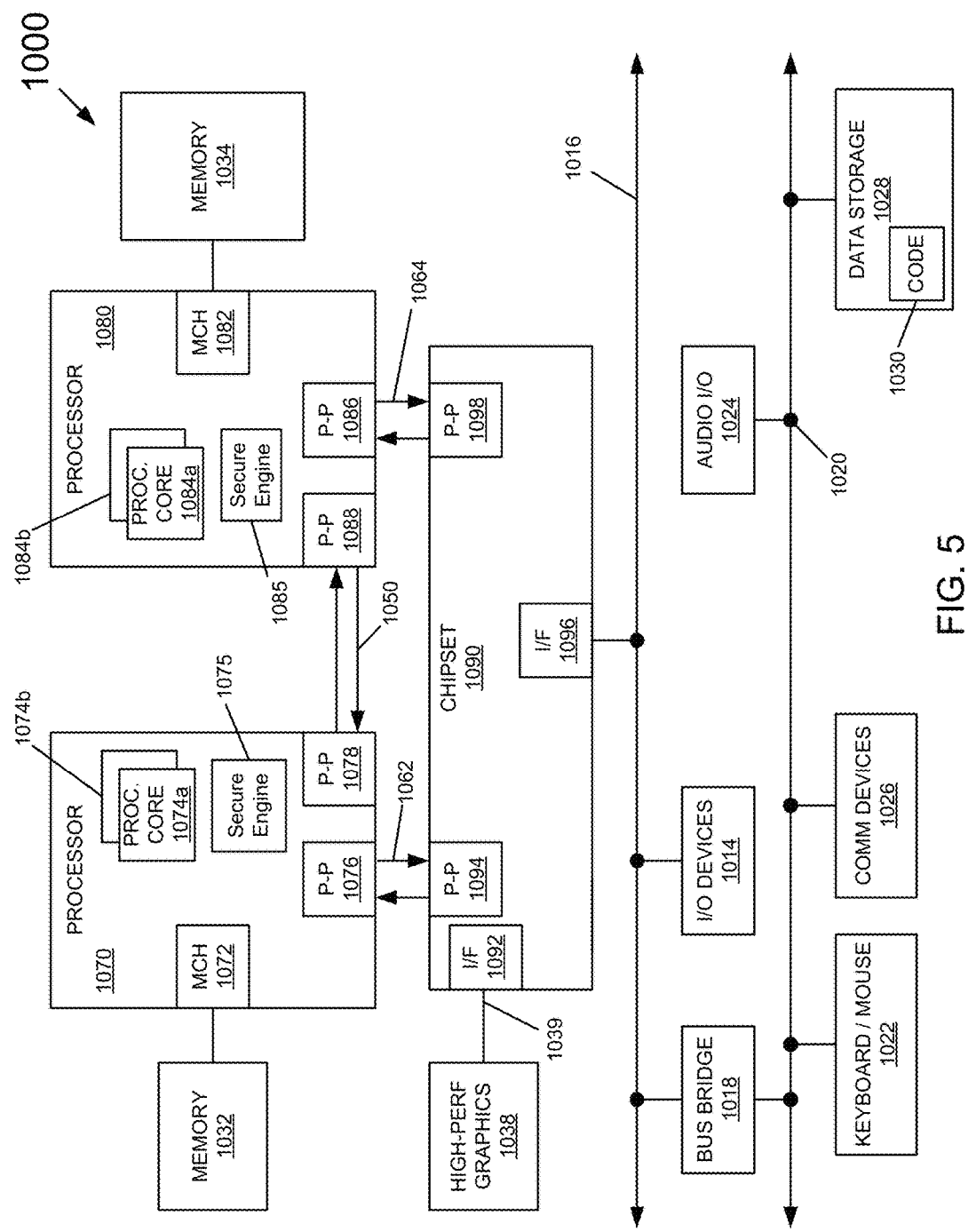
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085, which may be a dedicated hardware logic or other hardware circuitry to perform security operations including the code reuse attack and protection measures described herein.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. In an embodiment such code may include binary analysis code as described herein to detect ROP and other code reuse attacks. Further, an audio I/O 1024 may be coupled to second bus 1020.

Thus as seen using an embodiment, on-demand binary analysis may be used to verify the legitimacy of a RET instruction in question by not only validating whether the CALL instruction preceding the return target is legitimate, but also inferring the target function address for this CALL instruction, analyzing the function code discovered, forming a control flow graph until it reaches the function exit with the RET instruction to determine whether it is the same RET instruction. Embodiments also may use a number of techniques to further validate the legitimacy of the function code discovered from the binary analysis, including but not limited to, function prologue and epilogue code discovery, register convention violation and stack movement violation. Understand that embodiments may be applied to both a branch history-based analysis captured with hardware information, e.g., of a LBR record or processor trace hardware and to BT-based forward execution analysis.

The following Examples pertain to further embodiments.

In Example 1, a method for identifying a code reuse attack comprises: in response to a validation request associated with a first control transfer instruction, performing a first binary analysis of a first code region including a return target of the first control transfer instruction to determine whether a second control transfer instruction is included in the first code region; if the second control transfer instruction is included in the first code region, performing a second binary analysis of a second code region including a call target of the second control transfer instruction to determine whether the second code region includes the first control transfer instruction; and identifying the first control transfer instruction as likely to be part of a code reuse attack if the second control transfer instruction is not included in the first code region or the first control transfer instruction is not included in the second code region.

In Example 2, the method further comprises storing an address pair associated with the first control transfer instruction into a whitelist table, if the second control transfer instruction is included in the first code region and the first control transfer instruction is included in the second code region.

In Example 3, the method further comprises, in response to a validation request associated with another control transfer instruction, indicating a likelihood of legitimate code when the another control transfer instruction is at an address associated with another address pair present in the whitelist table.

In Example 4, the method of one or more of the above Examples optionally further comprises receiving the validation request from a security agent, and reporting the identification of the first control transfer instruction as likely to be part of the code reuse attack to the security agent, where the security agent is to take at least one security action in response to the identification.

In Example 5, the method further comprises, in the first binary analysis, determining whether a first function entry is present in the first code region prior to the return target and if so, decoding instructions of the first code region beginning at the first function entry.

In Example 6, the method further comprises, if the first code region does not include a function entry prior to the return target, decoding instructions of the first code region beginning at a predetermined distance prior to the return target.

In Example 7, the method of one or more of the above Examples optionally further comprises: generating a control flow graph of the first code region and determining whether the control flow graph includes a call instruction that matches a call instruction decoded in the first code region; and if so, initiating the second binary analysis.

In Example 8, the method further comprises, if the control flow graph does not include the call instruction that matches the call instruction decoded in the first code region, identifying the first control transfer instruction as likely to be part of the code reuse attack, if the return target is not aligned to an instruction boundary of the control flow graph.

In Example 9, the method of one or more of the above Examples optionally further comprises determining whether a stack pointer value is maintained within a predetermined set of values during the second binary analysis of the second code region, the second code region including a second function called by the second control transfer instruction.

In Example 10, the method further comprises determining whether an application binary interface of the second function is violated during the second binary analysis of the second code region.

In Example 11, the method further comprises identifying a prologue of the second function and an epilogue of the second function, and identifying the first control transfer instruction as likely to be part of the code reuse attack, if at least one of the prologue and the epilogue are not identified.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 12, a processor for performing binary analysis comprises: at least one core; and a binary translator to perform binary translation of code. In an example, the binary translator may be configured to: perform a first binary analysis of a first code block to determine whether a second control transfer instruction is included in the first code block, where the first code block includes a return target of a first control transfer instruction; perform a second binary analysis of a second code block to determine whether the second code block includes the first control transfer instruction, where the second code block includes a call target of the second control transfer instruction; and store an address pair associated with the first control transfer instruction in a whitelist if the second control transfer instruction is included in the first code block and the first control transfer instruction is included in the second code block.

In Example 13, the processor is to receive a validation request associated with another control transfer instruction and indicate a likelihood of legitimate code when the another control transfer instruction is at an address associated with another address pair present in the whitelist, without the binary translator to perform the first binary analysis or the second binary analysis.

In Example 14, the processor optionally further comprises a last branch recorder, where the binary translator is to receive a first address pair from the last branch recorder and identify the first code block based at least in part on a first address of the first address pair and identify the second code block based at least in part on a second address of the first address pair.

In Example 15, the binary translator comprises a decoder to decode control transfer instructions and instruction length of instructions of the first code block, and otherwise to not decode the instructions of the first code block.

In Example 16, the processor optionally further comprises a branch prediction logic, and where the binary translator is to perform the first binary analysis and the second binary analysis in response to a misprediction of the first control transfer instruction.

In Example 17, in the first binary analysis, the binary translator is to validate that the second control transfer instruction is a legitimate instruction; and in the second binary analysis, the binary translator is to analyze a function associated with the second control transfer instruction to determine whether the function exits with the first control transfer instruction.

In Example 18, a method for reporting a code reuse attack comprises: receiving from a security agent, in a binary translation logic of a processor, a validation request associated with a first control transfer instruction; performing, in the binary translation logic, a first binary analysis of a first code region including a target of the first control transfer instruction to determine whether a second control transfer instruction is included in the first code region; performing, in the binary translation logic, a second binary analysis of a second code region including a target of the second control transfer instruction to determine whether the second code region includes the first control transfer instruction; and reporting to the security agent a likelihood of a code reuse attack if the second control transfer instruction is not included in the first code region or the first control transfer instruction is not included in the second code region.

In Example 19, the method further comprises storing an address pair associated with the first control transfer instruction into a whitelist table if the second control transfer instruction is included in the first code region and the first control transfer instruction is included in the second code region.

In Example 20, the method further comprises: determining, in the first binary analysis, whether a first function entry is present in the first code region prior to the target, and if so decoding instructions of the first code region beginning at the first function entry; and if the first function entry is not present in the first code region prior to the target, decoding instructions of the first code region beginning at a predetermined distance prior to the target.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 21, an apparatus for reporting a code reuse attack comprises: means for receiving a validation request associated with a first control transfer instruction; means for performing a first binary analysis of a first code region including a target of the first control transfer instruction to determine whether a second control transfer instruction is included in the first code region; means for performing a second binary analysis of a second code region including a target of the second control transfer instruction to determine whether the second code region includes the first control transfer instruction; and means for reporting a likelihood of a code reuse attack if the second control transfer instruction is not included in the first code region or the first control transfer instruction is not included in the second code region.

In Example 22, the apparatus further comprises means for storing an address pair associated with the first control transfer instruction into a whitelist table if the second control transfer instruction is included in the first code region and the first control transfer instruction is included in the second code region.

In Example 23, the apparatus further comprises means for indicating a likelihood of legitimate code when another control transfer instruction is at an address associated with another address pair present in the whitelist table.

In Example 24, the apparatus further comprises: means for determining whether a first function entry is present in the first code region prior to the target and first means for decoding instructions of the first code region beginning at the first function entry; and second means for decoding instructions of the first code region beginning at a predetermined distance prior to the target if the first function entry is not present in the first code region prior to the target.

In Example 25, the means for reporting the likelihood of the code reuse attack is to report the likelihood of the code reuse attack to a security agent, where the security agent is to take at least one security action in response to the likelihood of the code reuse attack.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a computing system to:
   in response to a validation request associated with a first control transfer instruction, perform, in a binary analysis engine of a hardware binary translation logic, a first binary analysis of a first code region comprising a caller-based side and including a return target of the first control transfer instruction to determine whether a second control transfer instruction is included in the first code region;
   if the second control transfer instruction is included in the first code region, perform, in the binary analysis engine, a second binary analysis of a second code region comprising a callee-based side and including a call target of the second control transfer instruction to determine whether the second code region includes the first control transfer instruction;
   identify the first control transfer instruction as likely to be part of a code reuse attack when the second control transfer instruction is not included in the first code region or the first control transfer instruction is not included in the second code region; and
   report the identification of the first control transfer instruction as likely to be part of the code reuse attack to a security agent within the computing system to cause the security agent to take at least one security action in response to the identification.

2. The at least one non-transitory computer readable medium of claim 1, further comprising instructions that when executed enable the computing system to store an address pair associated with the first control transfer instruction into a whitelist table, when the second control transfer instruction is included in the first code region and the first control transfer instruction is included in the second code region.

3. The at least one non-transitory computer readable medium of claim 2, further comprising instructions that when executed enable the computing system, in response to a validation request associated with another control transfer instruction, to indicate a likelihood of legitimate code when the another control transfer instruction is at an address associated with another address pair present in the whitelist table, and without the binary analysis engine to perform the first binary analysis or the second binary analysis.

4. The at least one non-transitory computer readable medium of claim 1, further comprising instructions that when executed enable the computing system to receive the validation request from the security agent.

5. The at least one non-transitory computer readable medium of claim 1, further comprising instructions that when executed enable the computing system, in the first binary analysis, to determine whether a first function entry is present in the first code region prior to the return target and when so, decode instructions of the first code region beginning at the first function entry.

6. The at least one non-transitory computer readable medium of claim 5, further comprising instructions that when executed enable the computing system, when the first code region does not include a function entry prior to the return target, to decode instructions of the first code region beginning at a predetermined distance prior to the return target.

7. The at least one non-transitory computer readable medium of claim 6, further comprising instructions that when executed enable the computing system to:
generate a control flow graph of the first code region and determine whether the control flow graph includes a call instruction that matches a call instruction decoded in the first code region; and
when so, to initiate the second binary analysis.

8. The at least one non-transitory computer readable medium of claim 7, further comprising instructions that when executed enable the computing system, when the control flow graph does not include the call instruction that matches the call instruction decoded in the first code region, to identify the first control transfer instruction as likely to be part of the code reuse attack, if the return target is not aligned to an instruction boundary of the control flow graph.

9. The at least one non-transitory computer readable medium of claim 1, further comprising instructions that when executed enable the computing system to determine whether a stack pointer value is maintained within a predetermined set of values during the second binary analysis of the second code region, the second code region including a second function called by the second control transfer instruction.

10. The at least one non-transitory computer readable medium of claim 9, further comprising instructions that when executed enable the computing system to determine whether an application binary interface of the second function is violated during the second binary analysis of the second code region.

11. The at least one non-transitory computer readable medium of claim 9, further comprising instructions that when executed enable the computing system to identify a prologue of the second function and an epilogue of the second function, and identify the first control transfer instruction as likely to be part of the code reuse attack, when at least one of the prologue and the epilogue are not identified.

12. A processor for performing binary analysis comprising:
at least one core; and
a hardware security circuit engine comprising a binary translator to perform binary translation of code, the binary translator to:
perform a first binary analysis of a first code block comprising a caller-based side and to determine whether a second control transfer instruction is included in the first code block, wherein the first code block includes a return target of a first control transfer instruction;
perform a second binary analysis of a second code block comprising a callee-based side and to determine whether the second code block includes the first control transfer instruction, wherein the second code block includes a call target of the second control transfer instruction; and
store an address pair associated with the first control transfer instruction in a whitelist when the second control transfer instruction is included in the first code block and the first control transfer instruction is included in the second code block, wherein the binary translator is, after the performance of the first binary analysis and the second binary analysis and the storage of the address pair in the whitelist, to not perform the first binary analysis or the second binary analysis for the first control transfer instruction or the second control transfer instruction in response to a determination that the address pair is stored in the whitelist.

13. The processor of claim 12, wherein the processor is to receive a validation request associated with another control transfer instruction and indicate a likelihood of legitimate code when the another control transfer instruction is at an address associated with another address pair present in the whitelist, without the binary translator to perform the first binary analysis or the second binary analysis.

14. The processor of claim 12, further comprising a last branch recorder, wherein the binary translator is to receive a first address pair from the last branch recorder and identify the first code block based at least in part on a first address of the first address pair and identify the second code block based at least in part on a second address of the first address pair.

15. The processor of claim 14, wherein the binary translator comprises a decoder to decode control transfer instructions and instruction length of instructions of the first code block, and otherwise to not decode the instructions of the first code block.

16. The processor of claim 12, wherein the processor further comprises a branch prediction logic, and wherein the binary translator is to perform the first binary analysis and the second binary analysis in response to a misprediction of the first control transfer instruction.

17. The processor of claim 12, wherein:
in the first binary analysis, the binary translator is to validate that the second control transfer instruction is a legitimate instruction; and
in the second binary analysis, the binary translator is to analyze a function associated with the second control transfer instruction to determine whether the function exits with the first control transfer instruction.

18. A method for reporting a code reuse attack comprising:
receiving from a security agent, in a hardware binary translation logic of a processor, a validation request associated with a first control transfer instruction;

performing, in the hardware binary translation logic, a first binary analysis of a first code region comprising a caller-based side and including a target of the first control transfer instruction to determine whether a second control transfer instruction is included in the first code region;

performing, in the hardware binary translation logic, a second binary analysis of a second code region comprising a callee-based side and including a target of the second control transfer instruction to determine whether the second code region includes the first control transfer instruction; and reporting to the security agent a likelihood of a code reuse attack when the second control transfer instruction is not included in the first code region or the first control transfer instruction is not included in the second code region, to cause the security agent to take at least one security action.

19. The method of claim 18, further comprising storing an address pair associated with the first control transfer instruction into a whitelist table when the second control transfer instruction is included in the first code region and the first control transfer instruction is included in the second code region.

20. The method of claim 18, further comprising:

determining, in the first binary analysis, whether a first function entry is present in the first code region prior to the target, and if so decoding instructions of the first code region beginning at the first function entry; and if the first function entry is not present in the first code region prior to the target, decoding instructions of the first code region beginning at a predetermined distance prior to the target.

\* \* \* \* \*